Nov. 11, 1941.  J. C. STRAW  2,262,150
PARTS ASSEMBLING MACHINE
Filed Oct. 9, 1940  4 Sheets-Sheet 1
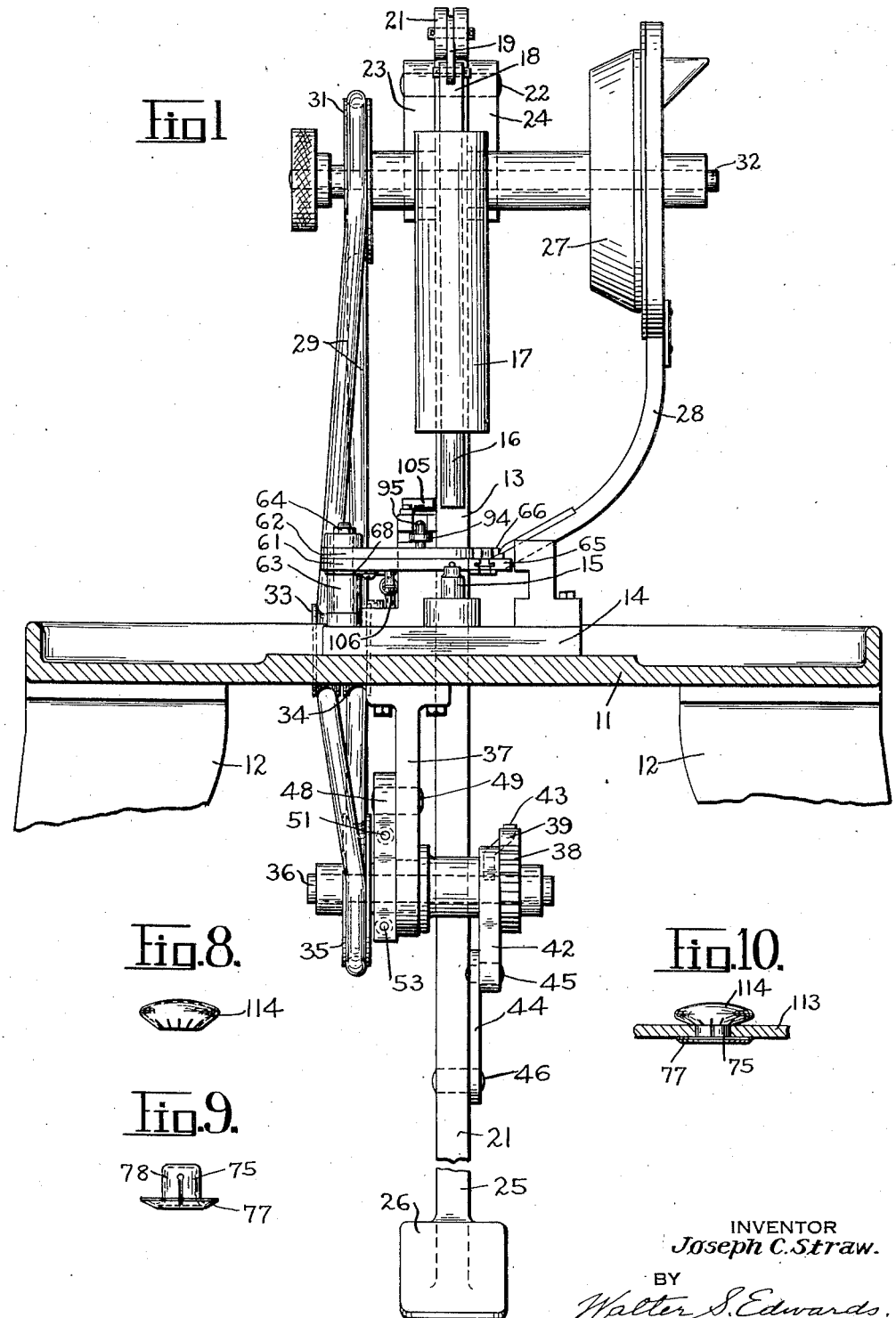
INVENTOR
Joseph C. Straw.
BY
Walter S. Edwards.
ATTORNEY

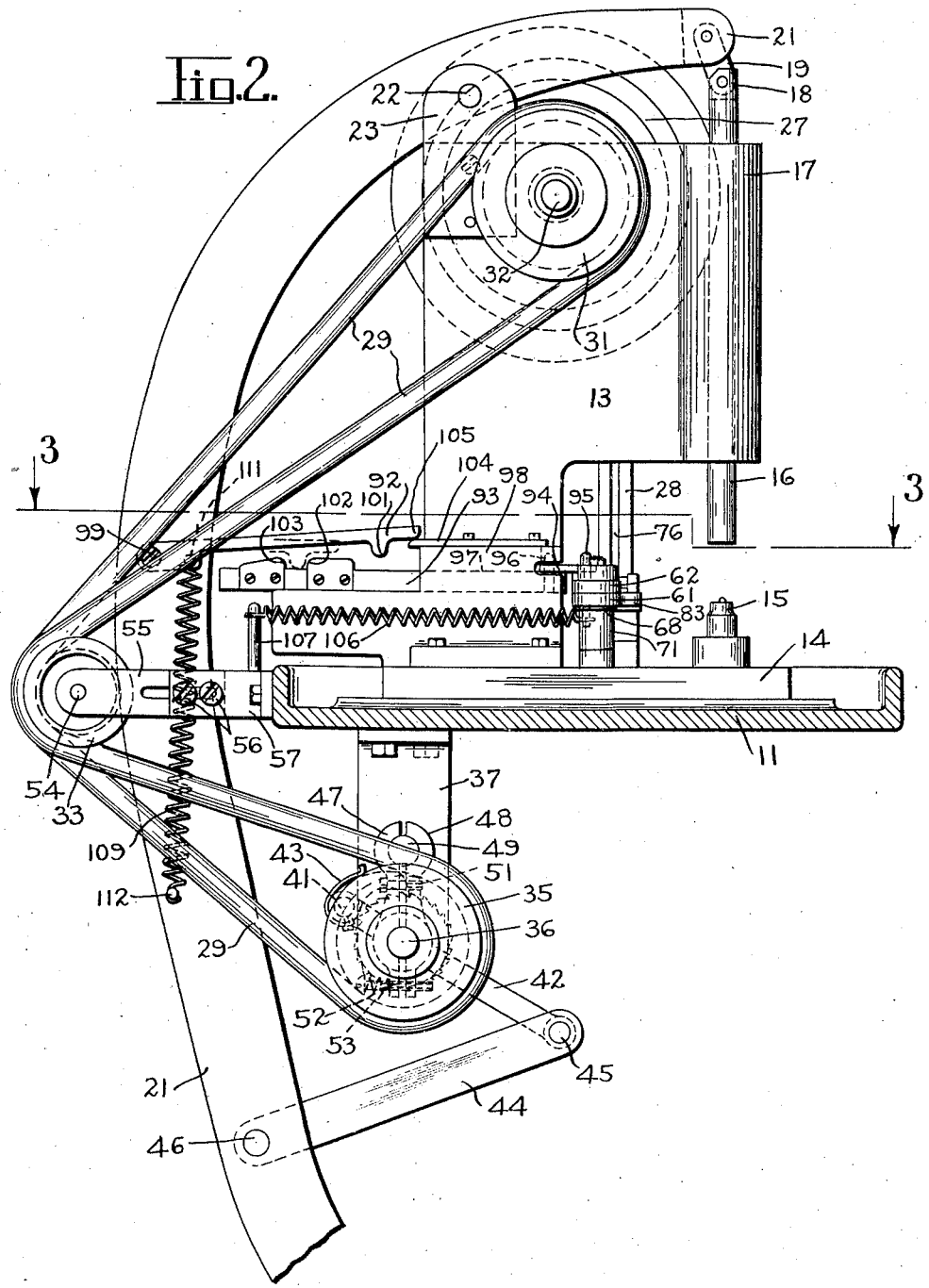

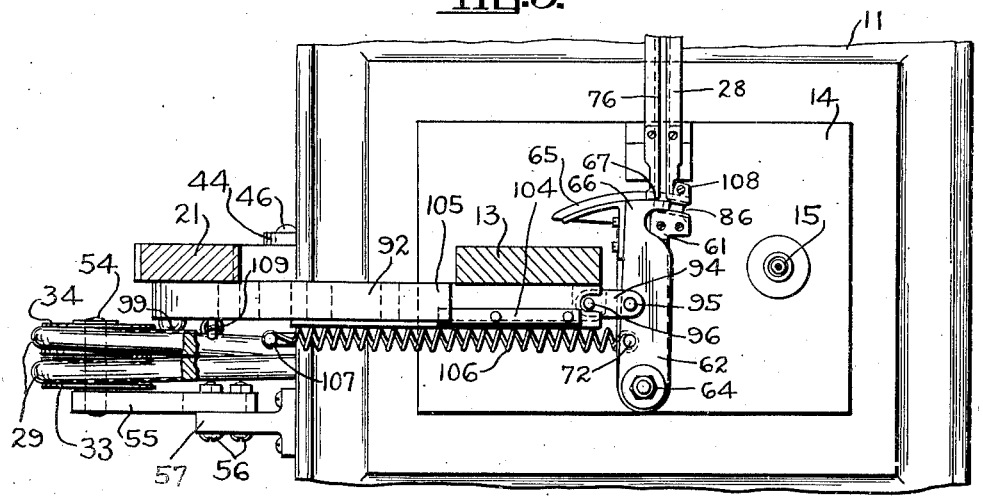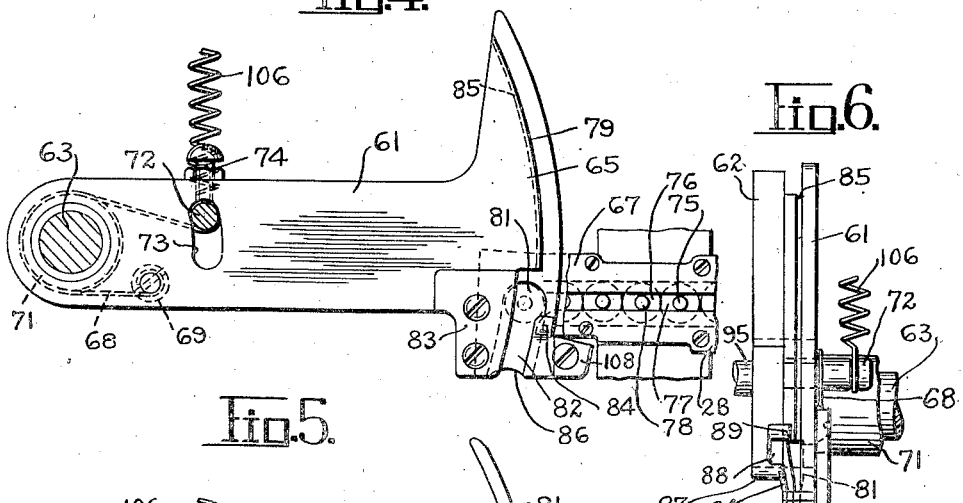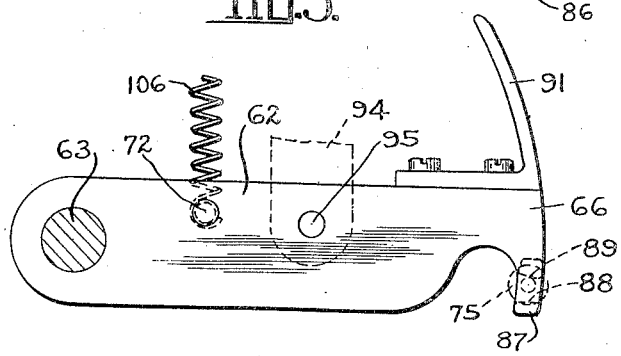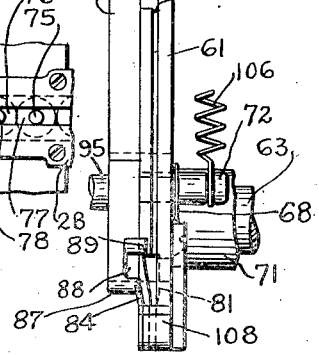

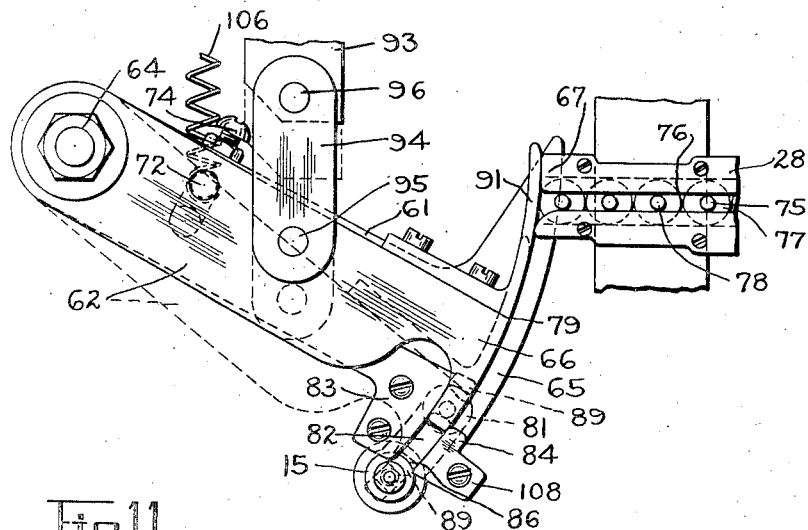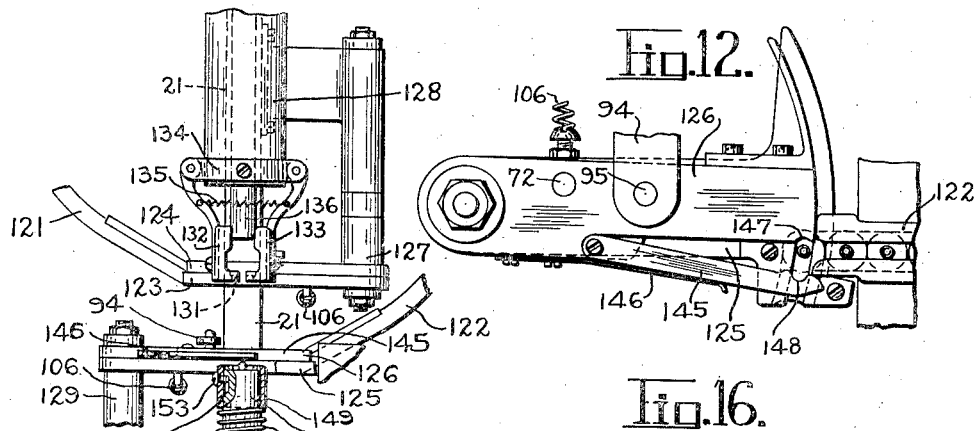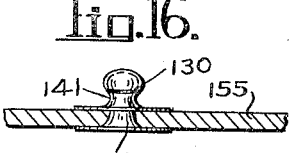

Patented Nov. 11, 1941

2,262,150

UNITED STATES PATENT OFFICE 2,262,150

PARTS ASSEMBLING MACHINE

Joseph C. Straw, Middlebury, Conn., assignor to The Waterbury Lock & Specialty Company, a corporation of Connecticut Application October 9, 1940, Serial No. 360,391

20 Claims. (Cl. 218—6)

This invention relates to assembling machines and to a machine of this nature which is particularly adapted for assembling separable parts, such as fastener parts together and/or to a suitable fastener carrying means.

The principal object of this invention is to provide an improved form of an assembling machine.

Another object is to provide in a machine of the above nature improved means to transfer parts from a source of supply to a position in respect to another part whereby they may be assembled together.

Still another object is to provide in such a machine improved means for actuating the part transferring means and wherein provision is made to permit slippage in case interference occurs in the transfer of the parts from one position to another.

A further object of this invention is to provide a parts assembling machine which is particularly adapted to assemble fastener parts together and/or to a fastener carrying means.

A still further object is to provide an improved assembling machine of the above nature which will be relatively inexpensive to manufacture, simple in construction, and which is very efficient and durable in use.

With these and other objects in view, which will appear as the description proceeds, there have been illustrated in the accompanying drawings, two forms in which the features and principles of this invention may be conveniently embodied in practice.

In the drawings, wherein like reference numerals designate like parts throughout the several views:

Figure 1 is a front elevational view of a parts assembling machine embodying the features and principles of this invention;

Figure 2 is a side view of the same the base plate being sectioned and the parts of the machine being shown in their normal position of rest;

Figure 3 is a sectional view taken on the line 3—3 of Figure 2;

Figure 4 is an enlarged top view of a part transferring element and shown receiving such a part;

Figure 5 is an enlarged top view of another part transferring element;

Figure 6 is an enlarged end view of the elements shown in Figures 4 and 5 assembled together in operative position;

Figure 7 is a top plan view of the elements shown in Figures 4 and 5 assembled together and illustrates the delivery of a fastener part to an assembling die;

Figure 8 is an enlarged side view of a fastener part which the machine of this invention is adapted to assemble to another fastener part;

Figure 9 is an enlarged side view of another fastener part adapted to be assembled to the part shown in Figure 8 by the machine of this invention;

Figure 10 shows the parts illustrated in Figures 8 and 9 assembled together and to a fastener carrying means;

Figure 11 illustrates a modified form of machine having two sets of parts transferring means and wherein the features and principles of this invention are included;

Figure 12 is an enlarged top view of a parts transferring means adapted for use with the modified improved machine of this invention;

Figure 13 is a broken sectional view of the operating end of a punch adapted for use with the modified improved machine of this invention;

Figure 14 is an enlarged view of a fastener part upon which the punch shown in Figure 13 and the machine of this invention are adapted to operate;

Figure 15 is an enlarged side view of another fastener part to which the part shown in Figure 14 is adapted to be assembled by the machine of this invention; and Figure 16 shows parts illustrated in Figures 14 and 15 assembled together and to a fastener carrying means.

Referring now more particularly to the form of machine illustrated in Figures 1–7 inclusive, wherein the features and principles of this invention are shown applied to a so-called foot press and adapted to assemble fastener parts together and to a fastener carrying means, a supporting base plate, or tray, 11 seated on suitable legs 12 has a vertically disposed standard 13 mounted thereon upon a die block 14, suitably secured to a plate 11. The block 14 supports a die 15 in alignment with a punch 16, slidably mounted in an enlarged front edge portion 17 of the standard 13, which portion 17 extends forwardly to overhang the die 15. The punch 16, in this instance, is constituted by an elongated rod having its upper end 18 connected, as by a link 19, to a treadle lever 21. The treadle lever 21 is pivoted, on a pin 22, to and between lugs 23 and 24, suitably fastened to the standard 13, and extends downwardly in back of the base plate 11 and then forwardly below the plate 11, its lower end 25 having a foot pad 26 thereon, whereby the lever 21 may be actuated by the foot of the operator.

A hopper 27 of suitable construction to contain, in this instance, fastener parts and feed them to a chute 28, is rotatably mounted on the standard 13 and is adapted to be rotated by a belt 29 through a pulley 31 connected to the hopper 27 by a shaft 32 in the usual and well-known manner. The belt 29 is led over idler pulleys 33 and 34 and to, and over, a pulley 35 mounted on a shaft 36 jouraled in a bracket 37 depending from beneath the base plate 11. A ratchet wheel 38 secured upon the shaft 36 is adapted to be intermittently rotated by a pawl 39, pivoted at 41 (see Figure 2) to one end of a lever 42 rockably supported on the shaft 36. A leaf spring 43 secured to the lever 42 is provided, to maintain the pawl 39 in engagement with the ratchet wheel 38. The other end of the lever 42 is pivotally connected to one end of a link 44 by a pin 45. The other end of the link 44 is pivotally connected to the treadle lever 21 by a pin 46. Rocking movement of the treadle lever 21 rearwardly, by the operator, will rock the lever 42 and, through the pawl 39 and ratchet wheel 38, cause the shaft 36 will, through the pulley rotation of the shaft 36 will, through the pulley 35, belt 29 and pulley 31, cause the hopper 27 to be rotated to feed fastener parts therefrom into the chute 28 in the usual manner.

To avoid possible undesired short movements of the pawl 39 on the ratchet wheel 38, due to possible subsequent swinging movements of the treadle lever 21 after being actuated by the foot of the operator, a friction device is provided to act upon the shaft 36. The friction device illustrated includes, a pair of opposing members 47 and 48 (see Figure 2), the upper ends of which are adapted to embrace a stud 49 extending from the bracket 37 and to be clamped thereto by a screw 51. The lower ends of the friction applying members 47 and 48 embrace the shaft 36 and are urged into frictional engagement therewith by a spring 52 reacting between the head of a screw 53, screw-threaded into the member 48, and the member 47. Should a jam of fastener parts occur in the hopper 27, or other interference occur preventing its rotation, the belt 29 will slip on the pulley 31, or the pulley 35 will slip under the belt 29, or both, to prevent any possible damage. The pulleys 33 and 34 (see Figure 2) are mounted on a stud shaft 54 secured in an arm 55, in turn adjustably secured, as by screws 56, to a bracket 57 extending rearwardly from the base plate 11. Adjustment of the arm 55 on the bracket 57 will vary the tension of the belt 29 and its frictional engagement on the pulleys 31, 33, 34, and 35, and thus determine the point at which the belt 29 will slip thereon.

The improved means for transferring parts such as the fastener parts shown herein from the chute 28 to a position between the assembling means, herein constituted by the die 15 and the punch 16, includes an arm 61 and an arm 62, the latter one, 62, being superposed upon the arm 61. The arms 61 and 62 are pivotally secured upon a post 63 extending upwardly from the die block 14 by a nut 64, the post 63 constituting a common pivot for the arms 61 and 62 and being disposed a substantial amount to one side and back of the aligned vertical center lines of the punch and die 16 and 15 respectively. The arms 61 and 62 are swingable, relatively to each other, upon the post 63 and extend across and in back of, the punch 16 and die 15, to dispose their free ends 65 and 66, respectively, closely adjacent to the lower, and delivery, end 67, of the chute 28. The arms 61 and 62 are resiliently connected together for simultaneous swinging movement by a spring 68.

The spring 68 is secured, at one of its ends, to the arm 61 by a screw 69, then wrapped at least once about a spacing sleeve 71 formed as a part of the arm 61 and surrounding the post 63, and then has its other end extended and hooked about a pin 72 extending downwardly through the arm 61 from the arm 62 to which said pin 72 is secured. The pin 72 extends through an arcuately elongated slot 73 (see Figure 4) formed in the arm 61 and provided to permit the aforesaid relative movement between the arms 61 and 62. An adjusting screw and nut 74 combination is provided, whereby the arms 61 and 62 may be adjusted relatively to each other.

The chute 28, in this instance, is adapted to guide fastener parts 75 (see Figure 9) moved from the hopper 27 to the lower arm 61 by gravity, and is provided with an inverted T-slot 76 for this purpose, the base 77 of the fastener part being guided by the larger-in-width slot portion and the stud portion 78 of the fastener part being guided by the smaller-in-width slot portion. The free end 65 of the arm 61 (see Figure 4) is shouldered back from its extreme end to provide a stop shoulder 79 against which the fastener parts may engage, to prevent them dropping from the chute 28 when the arm 61 is swung away therefrom, the end 65 and the shoulder 79 being extended arcuately and rearwardly for this purpose. The arm 61, at its portion adjacent the end of the slot 76 in the chute 28, is provided, in this instance, with a fastener part receiving depression 81 from which an inverted T-slot 82 arcuately extends toward the front of the arm 61, a plate 83 secured to the arm 61, in this instance, forming a part of said T-slot. A tongue 84, formed on the plate 83, overlies the lower end 67 of the chute 28, and an extension thereof forms the opposite part of said T-slot. The tongue 84 guides the fastener part toward the depression 81, the base 77 of the fastener part passing under the tongue 84. The depression 81 with the T-slot 82 forms, what may be termed, a continuation of a T-slot 76 in the chute 28, and which is disposed substantially at right angles thereto. The end face of the shoulder 79 may be grooved, as at 85, if desired, to form a track for the base 77 of the fastener part to assist in maintaining it in proper position to feed to the depression 81 in the arm 61. The post 63 is so positioned that when the arm 61 is swung thereabout (see Figure 7) the center line of the T-slot 82 will align with an arc struck through the vertical center axis of the die 15 with the axis of the post 63 as its center. Thus, when so swung, the arm 61 will engage against the die 15 on an arcuately cut-away surface 86 in the arm 61, the arm 61 at the bottom of the T-slot 82 being disposed substantially in horizontal alignment with the top surface of said die 15 so that fastener parts may be slid along from the T-slot 82 in the arm 61 and will drop onto the die 15 in alignment with the punch 16.

The means for sliding the parts to be assembled, such as the fastener parts shown from the T-slot 82 in the arm 61 onto the die 15 (see Figures 6 and 7) is constituted by the arm 62. The arm 62, at its free end 66, is provided with a forwardly directed finger 87 which is aligned with the T-slot 82 and has a cross-slot 88 formed in its under-surface. The cross-slot 88 is so positioned that when the free ends 65 and 66 of the arms 61 and 62 are adjacent the lower end 67 of the chute 28 in position to receive a fastener part therefrom, the stud portion 78 of the fastener part will readily slide therethrough. A depending shoulder 89 is formed on the arm 62 and extends downwardly behind the stud portion 78 of any fastener part positioned in the depression 81 of the arm 61, and is adapted to engage and move this fastener part from the T-slot 82, when the arm 61 is positioned in engagement with the die 15, and the arm 62 is moved relatively to the arms 61 toward the die 15 (see dotted lines in Figure 7). The slot 73, in the arm 61 and in which the pin 72 slides, is of such length that, when the arm 61 abuts the die 15, the arm 62, by means of the shoulder 89, will position the fastener part directly over the die upon which it will then drop. Engagement of the pin 72 with the arm 61 at the forward end of the slot 73 will stop further forward movement of the arm 62 by the lever 21. The arm 62 is provided with a rearwardly extended arcuate tongue 91 to be disposed in front of the lower end 67 of the chute 28 to prevent the dropping of fastener parts therefrom when the arm 62 is in its forwardly swung position to move a fastener part onto the die 15.

The arms 61 and 62 are swung from their chute adjacent position to their die adjacent position, and the arm 62 to move a fastener part from the arm 61 to the die 15, by the forward movement of the treadle lever 21 when it is released by the operator, through the medium of a bar 92, a slide 93, and a link 94. The link 94 is connected to the arm 62 by a pin 95 and to the slide 93 by a pin 96. The slide 93 is arranged to slide in a slot 97 formed in the base 98 of the standard 13. The bar 92 is pivoted at its rear end to the treadle lever 21 by a screw 99 and overlies the rear end of the slide 93. A lug 101 having rounded front and rear edges depends from the under-surface of the bar 92 to engage in back of a rearwardly facing shoulder 102 formed on the slide 93, as indicated in dotted lines in Figure 2, when the treadle lever 21 is pushed rearwardly by the operator to lower the punch 16 toward the die 15 and against fastener parts disposed therebetween.

A forwardly directed shoulder 103 is provided on the slide 93 and positioned to be engaged by the lug 101 during its rearward movement to move the slide rearwardly, if certain conditions to be hereinafter disclosed require it to do so. The upper lug facing edges of the shoulders 102 and 103 are also rounded whereby, should interference be sustained preventing the swinging movement of the arm 62 towards the die 15, the lug 101 will ride up and over the shoulder 102 and obviate any possible breakage or other damage to the machine, etc., and whereby the bar 92 may be moved rearwardly after rearwardly positioning the slide 93. A bar releasing member 104 is provided to be engaged by the forward rounded end 105 of the bar 92 to raise the lug 101 from in back of the shoulder 102 to permit free movement of the slide 93 rearwardly by means of a coiled spring 106, reacting between the pin 72 on the arm 62 and a post 107 secured in the base plate 11, and to permit the lever 21 to continue its forward movement into its normal position of rest. The forwardly directed shoulder 103 is provided to insure rearward movement of the slide 93 should the spring 106 break, or become too weak to properly return the slide 93 into its rearward position and remove the arms 61 and 62 from over the die 15 and from in under the punch 16. An extension 108, provided on the arm 61 and adapted to engage the lower end 67 of the chute 28 limits the rearward swinging movement of the arms 61 and 62 and, through the arm 62 and the link 94, the rearward sliding movement of the slide 93. A coiled spring 109, reacting between a pin 111 on the bar 92 and a pin 112 on the treadle lever 21, constantly urges the bar 92 downwardly in shoulder engaging position.

The operation of the above described machine is believed obvious from the above, and briefly is as follows. An operator presses the treadle lever 21 rearwardly whereby the lug 101 and the bar 92 will drop behind the shoulder 102 and lets the lever 21 swing forwardly to move the slide 93 forwardly. This forward movement of the slide 93 swings the arms 61 and 62 to deposit a part, such as the fastener part shown in Figure 9, upon the die 15, the arm 62 being pushed by the slide 93 and the arm 61 following due to its resilient connection through the spring 68 and the pin 72 with the arm 62. When the arm 61 engages the die 15 and the swinging movement thereof is stopped, the arm 62 continues to move to carry, in this instance, the fastener part 75 from the arm 61 to the die 15. When the fastener part 75 has been carried to a position directly over the die 15, the arm 62 is stopped, due to the aforesaid engagement of the pin 72 with the forward end of the slot 73 in the arm 61 (as indicated in dotted lines in Figure 7), and the fastener part will then be disposed on the die 15 in line with the punch 16. As this action takes place the end 105 of the arm 92 rides up over the plate 104 and the slide is free to be returned by the spring 106. A fastener receiving means, such as a strip of material 113, (see Figure 10) which has suitable fastener part receiving holes punched therein, is laid over the die 15 and part 75 to allow the stud 78 of the fastener part to protrude upwardly therefrom. A fastener part 114 (see Figure 8) is then placed by the operator over the stud 78 and the treadle lever 21 is again pressed rearwardly to force the punch against the fastener part 114, and it in turn downwardly over the stud 78, which is forced into the part 114 and tightly crimped therein to secure the fastener parts together and to the strip of material 113 in the manner desired. The strip 113 is now removed from the die 15. As the treadle lever 21 was pressed rearwardly to assemble the parts, the hopper 27 was rotated, and as the lever 21 again swings forwardly the arms 61 and 62 again deposit a part on the die 15 provided no interference is sustained, such as, for instance, the failure of the operator to remove the strip 113 from the die 15. Should such interference exist the lug 101 on the bar 92 will ride up over the shoulder 102 and further movement of the arms 61 and 62 will be stopped, and they will automatically return to their part receiving position due to the action of the spring 106 on the pin 72 and on the arm 62, which through the link 94 returns the slide 93.

When it is desired to feed both parts to be assembled, for instance fastener parts such as shown in Figures 14 and 15, two hoppers may be provided on the shaft 32, one on either side of the standard 13. In such instances two chutes 121 and 122 are provided, one leading from one of the hoppers and directed toward a pair of arms 123 and 124, and the other leading from the other hopper and directed toward another pair of arms 125 and 126. The pairs of arms 123, 124, and 125, 126 are arranged one above the other as indicated in Figure 11, and are pivoted one pair, 123, 124, on a post 127 suspended from a standard 128 and the other pair, 125, 126, on a post 129 mounted on a die block similar to 14 in Figure 1. Two sets of bars and slides, not shown, but each similar in every respect to those shown in Figures 1, 2, and 3, are provided, one for actuating each pair of arms 123, 124, and 125, 126.

The upper pair of arms 123, 124 operate the same as the previously described arms 61 and 62 but are reversely formed to swing from an opposite side of the standard 13 to deposit a part such as the fastener part 130 (see Figure 14) onto a depressed surface 131 formed in the lower ends of a pair of opposing jaws 132 and 133 pivoted to a ring 134 fastened to the standard 128. The jaws 132 and 133 are constantly urged together by a coiled spring 135 and preferably engage against the lower end of a punch 136. In this instance the swinging movement of the lower arm 123 causes it to engage the jaws 132, 133 to be stopped thereby while the arm 124 moves the fastener part 130 from the arm 123 onto the depressed surface 131 of the jaws 132, 133. When descending, the punch 136 engages the fastener part 130, opens the jaws 132, 133, and carries it downwardly toward the die 137. In order that the fastener part 130 will not drop from the end of the punch 136, the latter is provided with means to retain the fastener part 130 thereto and this means is constituted by a spring tensioned wire finger 138 (Figure 13) which extends into a bore 139 formed in the end of the punch 136, and engages an annular groove 141 formed in the stud portion of the fastener part 130. The material of the finger 138 extends upwardly in a groove 142 and is crimped over on the opposite side of the punch to secure it thereto.

The arms 125, 126, in this instance (see Figure 15) serve to carry a fastener part 143 to be assembled to the part 130, said part 143 having a relatively long stud portion 144, and transfer it from the chute 122 to the die 137. In this instance the upper arm 126 is provided with a pivoted finger 145, acted upon by a leaf spring 146 to engage the stud 144 of the fastener part 143 and hold the same steady, in vertically disposed position between it and the arm 126, while it is being transferred. Both the arm 126 and the finger 145 are provided with arcuate grooves 147 and 148 respectively to embrace the stud portion 144. The die 137, in this instance, is provided with a slidable sleeve 149 which surrounds the die 137 and extends upwardly above the upper surface thereof to form a cup to receive the flange of and centralize the fastener part 143 when it is delivered thereto. The sleeve 149 is constantly urged upwardly by a coiled spring 151 reacting between the sleeve 149 and the die block 152, upon which the die 137 is mounted, and is limited in its sliding movements on the die 137 by a screw 153 cooperating with the die in an elongated slot 154 formed in the side thereof. The sleeve 149 is permitted to extend above the die 137 sufficiently to stop the arm 125 but not the arm 126 in their swinging movement and to receive the flange of the fastener part 143 and hold the part 143 therein while the finger 145 springs past the stud portion 144 of the part 143 when the arms 125 and 126 return to fastener-part receiving position.

As in the form shown in Figures 1-7 inclusive, the operator first actuates the treadle lever to dispose the fastener parts to be assembled on the depressed surface of the jaws 132 and 133 and onto the die 137. A piece of material 155 (see Figure 16) is then placed over the stud 144 of the fastener part 143, so that it extends through a hole in the material 155, and then the treadle lever is actuated to cause the punch 136 to descend and assemble, the two fastener parts 130 and 143 together and to the material 155. When the lower arms 125, 126 return to part receiving position, as shown in Figure 12, the finger 145 engages against the lower end of the chute 122 and is swung away from the arm 126 to provide sufficient space between it and said arm for parts 143 to feed by gravity from the chute into the depression in the arm 125, as in the previously described form.

By the provision, in a machine of the above nature, of the swingable arms pivoted to the rear and to one side of the die, and of the chute ends which terminate to the rear and to one side of the die, fastener, or like, carrying means of various widths may have fasteners applied thereto without said means being interferred with, or engaging, any of the machine parts, the standard 13 being considerably cut back below the lower end of the punch supporting portion therefor for this purpose. In view of the above described structure a machine for the purpose desired has been provided which is relatively simple in construction, of comparatively few parts, and is particularly efficient and durable in use. Due to the open arrangement of the various mechanisms in the machine of this invention, the parts thereof are readily accessible for changes, or repairs, and all of the movable parts, as well as the work, are plainly visible to the operator.

While there have been shown and described herein two forms of an improved assembling machine, it is to be understood that the invention may be embodied in other forms without departing from the spirit and essential attributes thereof. It is therefore desired that the present embodiments be considered in all respects as illustrative and not restrictive, and it will be further understood that each and every novel feature and combination thereof, present in, or possessed by, the mechanism herein disclosed, forms a part of the invention included in this application.

What is claimed as new and for which it is desired to secure Letters Patent, is:

1. In an assembling machine, relatively movable and cooperating punch and die, means containing a plurality of parts to be assembled to other parts, a chute to guide said parts from said parts-containing means to its lower end, and a pair of superimposed relatively movable arms, an end of each being commonly pivoted at one side of said die, and the other end of each being swingable past the lower end of said chute and toward said die, one of said arms being adapted to receive and carry a part from said chute to said die, means carried by the other arm to move the part onto said die from the part carrying arm when relative movement occurs between said arms, and means to swing said arms and to move one of them relatively to the other.

2. In an assembling machine, relatively movable cooperating punch and die, means containing a plurality of parts to be assembled to other parts, a chute to guide said parts from said parts-containing means to its lower end, and being disposed to one side and to the rear of said die, said chute having a part guiding slot therein, an arm having one of its ends pivotally mounted to the other side and to the rear of said die, and its other end being adapted to swing from the lower end of said chute to said die, said arm having a part guiding slot therein, and another arm swingable with said first arm and adapted to engage and move the part in the slot therein onto the die from said first arm, and means to swing said arms.

3. In an assembling machine having a part guiding means and a die, a pair of superimposed arms each having an end swingable from said guiding means to said die, and means to swing said arms, one of said arms having means thereon to receive and carry a part from said guiding means and the other of said arms having means thereon to engage and move the part received by said first arm therefrom and onto said die when said arms are swung by said arm swinging means.

4. In an assembling machine, a part guiding chute open at its lower end, a die, a first swingable arm having an end adapted to be positioned adjacent the open end of said chute to receive parts thereon by gravity from said chute, a second swingable arm having means to engage a part on the end of said first arm and move it therefrom, and means to swing said arms toward said die and said second arm relatively to said first arm to move the part from the first arm onto said die.

5. In an assembling machine, a part guiding chute open at its lower end, a die, a first swingable arm having an end adapted to be positioned adjacent the open end of said chute to receive parts thereon by gravity from said chute, a second swingable arm having means to engage a part on the end of said first arm and move it therefrom, means to swing said second arm from said chute to said die, and resilient means connecting said arms whereby said first arm will swing with said second arm toward said die to engage it and be stopped thereby and said second arm will continue to move to slide a part from said first arm onto said die.

6. In an assembling machine, means to transfer parts from a supply to an assembling means including a swingable arm, mechanism to swing said arm including a reciprocable bar cooperating with a slide connected to said arm, and slip means between said bar and said slide to operably connect them to swing said arm when said arm is free to swing and to disconnect them when movement of said arm is prevented.

7. In an assembly machine, means to transfer parts from a supply to an assembling tool including a swingable arm, mechanism to swing said arm including a reciprocable bar cooperating with a slide connected to said arm, a rounded edge lug on said slide, and a rounded edge lug on said bar to engage the lug on said slide to operably connect said bar to said slide to swing said arm, said rounded edges being arranged to slide past each other to disconnect said bar and slide when swinging of said arm is prevented.

8. In an assembling machine, a part guiding chute open at its lower end, a die, a first swingable arm having an end adapted to be positioned adjacent the open end of said chute to receive parts thereon by gravity from said chute, a second swingable arm having means to engage a part on the end of said first arm and move it therefrom, and mechanism to swing said arms including a reciprocable bar cooperating with a slide connected to one of said arms, and slip means between said bar and said slide to operably connect them to swing said arms when said bar is reciprocated and said arms are free to swing and to disconnect them when movement of said arms is prevented.

9. In an assembling machine, a part guiding chute open at its lower end, a die, a first swingable arm having an end adapted to be positioned adjacent the open end of said chute to receive parts thereon by gravity from said chute, a second swingable arm having means to engage a part on the end of said first arm and move it therefrom, a rounded edge lug on said slide, and a rounded edge lug on said bar to engage the lug on said slide to operably connect said bar to said slide to swing said arms, said rounded edges being arranged to slide past each other to disconnect said bar and slide when swinging of said arms is prevented.

10. In an assembling machine, a die, a punch, means to move said punch toward said die, means to lead parts from a supply, a pair of arms swingable from said parts-leading means to said punch to transfer parts thereto from said means, one of said arms being adapted to receive and support a part, and the other arm being adapted to remove the part from the first arm to the punch, and means on said punch to engage and releasably support the part to carry it toward said die.

11. In an assembling machine, a punch, a die, means to move said punch toward said die, separated means to carry a supply of different parts to be assembled together, a chute leading downwardly from each of said parts carrying means and having an open lower end, the lower ends of said chutes being disposed to the rear of and on opposite sides of said die, a pair of swingable arms arranged to move parts from one of said lower chute ends to said die, a pair of swingable arms arranged to move parts from the other of said lower chute ends to said punch, means at said punch to releasably receive parts from said swingable arms, a first arm of each pair being adapted to carry the part received from the respective chute and a second arm of each pair being adapted to move the part from the first arm and, at the die, to dispose it upon the die and, at the punch, to dispose it on said receiving means.

12. In an assembling machine, a die, a punch, means to move said punch toward said die, a chute to lead parts from a supply toward its lower open end, a pair of arms swingable from the lower open end of said chute to transfer parts from said chute to a position between said punch and die, one of said arms being adapted to receive and support a part and the other of said arms being adapted to remove the part from the first arm at the aforesaid transferred position, the upper one of said arms being superimposed upon the other and having a spring pressed arm pivoted thereto to cooperate with said upper arm to hold a fastener part in vertical position upon the lower arm.

13. In an assembling machine, a punch, a die, means to move said punch toward said die, separated means to carry a supply of different parts to be assembled together, a chute leading downwardly from each of said parts-carrying means and having an open lower end, the lower ends of said chutes being disposed to the rear of and on opposite sides of said die, a pair of swingable arms arranged to move parts from one of said lower chute ends to said die, a pair of swingable arms arranged to move parts from the other of said lower chute ends to said punch, means at said punch to releasably receive parts from said swingable arms, a first arm of each pair being adapted to carry the part received from the respective chute and a second arm of each pair being adapted to move the part from the first arm and, at the die, to dispose it upon the die and, at the punch, to dispose it, on said receiving means, and means on said punch to engage the part in said receiving means and carry it toward said die.

14. In an assembling machine, a die, a punch, means to move said punch toward said die, a chute to lead parts from a supply toward its lower end, a pair of arms swingable from the lower end of said chute to said punch to transfer parts thereto from said chute, and means on said punch to engage and releasably hold the part to carry it toward said die, mechanism to swing said arm including a reciprocable bar cooperating with a slide connected to said arm, and slip means between said bar and said slide to operably connect them to swing said arm when said arm is free to swing and to disconnect them when movement of said arm is prevented.

15. In an assembling machine, a die, a punch, means to move said punch toward said die, a chute to lead parts from a supply toward its lower open end, a pair of arms swingable from the lower open end of said chute to transfer parts from said chute to a position between said punch and die, the upper one of said arms being superimposed upon the other and having a spring pressed arm pivoted thereto to cooperate with said upper arm to hold a part in vertical position upon the lower arm, mechanism to swing said arm including a reciprocable bar cooperating with a slide connected to said arm, and slip means between said bar and said slide to operably connect them to swing said arm when said arm is free to swing and to disconnect them when movement of said arm is prevented.

16. In an assembling machine, a punch, a die, means to reciprocate said punch, a rotatable hopper to hold parts, means to rotate said hopper, a chute leading from said hopper downwardly and to a position to the rear and to one side of said punch and die, a pair of arms swingable to transfer parts from said chute to a position between said punch and die, a reciprocable slide to swing said arms, and means movable in one direction to actuate said hopper rotating means and said punch reciprocating means to move the punch in one direction and in the opposite direction to actuate said slide to swing said arms and said punch reciprocating means to move the punch in another direction.

17. In a parts assembling machine, cooperating punch and die relatively movable toward each other to act on a part disposed therebetween, and means to position a part between said punch and die including a pair of arms arranged to swing simultaneously, one of said arms being adapted to support the part and the other of said arms being adapted to remove the part from the first arm at the position between the punch and die, and means to swing the arms.

18. In a parts assembling machine, cooperating means to assemble fastener parts together, and means to position a part in position to be assembled to another part by said cooperating means including a swingable first arm adapted to receive and support the part and a second arm swingable with the first arm and adapted to remove the part from the first arm at the position to be acted on by said cooperating means, and means to swing said arms in timed relation.

19. In a parts assembling machine, means to assemble parts together, and means to carry and dispose a part to and at the assembling point including a swingable arm adapted to receive and support a part, and another swingable arm adapted to engage the part on the first arm and remove it therefrom at the assembling point.

20. In a parts assembling machine, means to assemble parts together, and means to carry and dispose a part to and at the assembling point including a swingable arm adapted to receive and support a part, and another swingable arm adapted to engage the part on the first arm and remove it therefrom at the assembling point, and means to swing said arms and adapted to be inoperative when movement of an arm is prevented.

JOSEPH C. STRAW.